(12) United States Patent
McCasker et al.

(10) Patent No.: US 7,082,952 B1
(45) Date of Patent: Aug. 1, 2006

(54) WELL CLEANING SYSTEM

(75) Inventors: Douglas B McCasker, Aroona (AU); David A Jobberns, Yandina (AU)

(73) Assignee: McBerns Pty LTD, Queensland (AU)

( * ) Notice: Subject to any disclaimer, the term of this patent is extended or adjusted under 35 U.S.C. 154(b) by 0 days.

(21) Appl. No.: 10/203,312

(22) PCT Filed: Feb. 9, 2000
(Under 37 CFR 1.47)

(86) PCT No.: PCT/AU00/00084

§ 371 (c)(1),
(2), (4) Date: Aug. 6, 2002

(87) PCT Pub. No.: WO01/58605

PCT Pub. Date: Aug. 16, 2001

(51) Int. Cl.
*B08B 9/00* (2006.01)
*E21B 37/00* (2006.01)

(52) U.S. Cl. .................. 134/58 R; 134/168 R; 134/174; 134/178; 134/180; 166/223

(58) Field of Classification Search .......... 134/18, 134/22.12, 22.18, 24, 29, 57 R, 58 R, 113, 134/166 R, 167 R, 168 R, 168 C, 167 C, 134/169 R, 166 C, 172, 174, 178, 180; 166/222–223
See application file for complete search history.

(56) References Cited

U.S. PATENT DOCUMENTS

| 4,490,876 A | 1/1985 | Haberl |
| 4,808,237 A | 2/1989 | McCormick et al. |
| 5,020,183 A * | 6/1991 | Grant, Jr. .................. 15/246.5 |
| 5,033,545 A * | 7/1991 | Sudol .......................... 166/312 |
| 5,317,782 A * | 6/1994 | Matsuura et al. ............. 15/324 |
| 6,281,489 B1 * | 8/2001 | Tubel et al. ........... 250/227.14 |

FOREIGN PATENT DOCUMENTS

| AU | 655 111 B | 12/1993 |
| DE | 3314987 | 11/1984 |
| DE | 3530157 | 3/1986 |
| DE | 43 01 388 A | 8/1993 |
| EP | 35763 | 9/1981 |
| EP | 156161 | 10/1985 |
| EP | 0 723 909 A | 7/1996 |
| EP | 829220 | 3/1998 |
| FR | 2729624 | 7/1996 |
| WO | 92/21829 | 12/1992 |

OTHER PUBLICATIONS

Derwent Abstract Accession No. 97-487122/45, JP 09-228427 A (Matsuishita Seiko KK) Sep. 2, 1997.
Derwent Abstract Accession No. 1999-564287/48, JP 11-243780 A (With Jpaan KK) Sep. 14, 1999.

* cited by examiner

*Primary Examiner*—Joseph L. Perrin
(74) *Attorney, Agent, or Firm*—Hudak, Shunk & Farine Co. LPA

(57) ABSTRACT

A well-cleaning system (10) is provided with a control system (30) where waste liquid level sensors (35, 36) co-operate with timers (39, 40) to control the frequency and duration of the well-cleaning cycles. Chemicals can be injected into the water on demand from a well-conditioning sensor (38); and the well-cleaning system (10) can be operated when high $H_2S$ gas levels are detected in the well (20) by a $H_2S$ gas sensor (37).

17 Claims, 5 Drawing Sheets

WELL CLEANING SYSTEM

BACKGROUND OF THE INVENTION

1. Field of the Invention

THIS INVENTION relates to well-cleaning systems.

2. Prior Art

AU-B-39856/93 (655111) (McCASKER) disclose a well-cleaning system particularly suitable for cleaning sewerage pump-station wells.

A common and expensive problem in most sewerage systems is the build-up of fatty residues on the walls and components of sewerage holding wells. If not regularly removed, these residues will adversely affect the efficiency of the sewerage system, causing damage to the expensive pumps and creating an unhealthy and smelly environment.

The well-cleaning system disclosed in AU-B-39856/93 discloses a rotary spray device mounted on a pivoting arm. Mains water is delivered to the device by a solenoid valve. The water travels through the two spray arms to special nozzles which are directed at the well's walls and components. The nozzle mountings are manually adjustable so that the water can be directed to "hard to get at" corners, and the speed of rotation is also manually adjustable. The solenoid valve is operable by a relay in the control board of the well's pump, so that it opens when the pump turns on. Thus, the cleaning process proceeds as the sewage level is dropping. The solenoid closes when the pump stops and so water consumption is kept to a minimum. The mounting bracket allows the washer to pivot back against the wall to allow uninhibited access to the pump(s) and other equipment at the base of the well.

While the well-cleaning systems hereinbefore described have found ready acceptance with civic and public authorities (eg., in Australia) responsible for handling sewage, a number of potential areas for improvement of the systems have been identified.

In some installations, it has been found that frequent well pump-out cycles result in large volumes of water being sprayed into the wells. Not only is this unacceptable from a water conservation aspect, but the water adds to the volume of sewage which must be treated at the sewerage treatment facility.

In normal operation the system only uses water to perform its cleaning function in the well. Wells can often be a source of bad odours and/or corrosive gases. It would be advantageous to inject into the water (a) a deodorant mask to overcome, or minimise, the odours and/or (b) chemical and/or biological additives to improve the quality of well contents.

Hydrogen sulphide ($H_2S$) gas is a major problem in sewage. It is toxic, explosive, corrosive and has an extremely offensive odour. It would be advantageous to provide a gas detector in the well to measure the $H_2S$ gas concentrations, to connect such a detector to a control unit which can operate the well-cleaning system when a predetermined $H_2S$ gas concentration is reached.

As the pumping-station wells are often located at locations remote from the control centre for the sewerage system, eg., for a city or local government area, it would be advantageous if the well-cleaning system could communicate conditions in the well to the control centre and be controlled therefrom in response to the conditions communicated.

In many countries, including the USA, the work-safety requirements for the man-entry of wells is extremely rigorous, and so man-entry is to be avoided, if possible, for the installation, maintenance, repair or replacement of equipment, eg., pumps, in the wells. It would be advantageous if the well-cleaning system could be installed, or retrieved, without requiring man-entry to the well. It would be further advantageous if the mounting for the well-cleaning system could take advantage of existing equipment installed in the well.

Finally, in some countries, eg., the United Kingdom, the use of reduced pressure zone (RPZ) valves, to prevent the backflow of water from the well-cleaning system to the reticulated mains water supply is not permitted. It is, therefore, necessary to provide a pressurised water supply, for well-cleaning system, which is isolated by an air gap from the mains supply.

SUMMARY OF THE PRESENT INVENTION

It is an object of the present invention to provide a well-cleaning system where the volume of water used during the cleaning operation is minimised.

It is a preferred object to provide a control system for such a system, where the supply of cleaning water to the well-cleaning system is controlled by a computerised control unit, which controls the frequency, and duration of the period, that water is sprayed in the well.

It is a further preferred object to provide such a control system where the conditions in the well can be monitored and chemicals can be selectively injected into the cleaning water to reduce odours and/or improve well conditions.

It is a still further preferred object to provide such a control system which can monitor hydrogen sulphide gas concentrations in the well and operate the system when the concentration reaches a preset limit.

It is a still further preferred object to provide such a control system which can communicate with, or be controlled by, a remote control location.

It is a still further preferred object to provide such a well cleaning system where the mounting arm is mounted on a carriage movable along pump rail(s) in the well and is retrievable without man-entry to the well.

It is a still further preferred object to provide a well-cleaning system with a pressurised cleaning water supply, separate from a mains supply, by an air gap to prevent backflow.

Other preferred objects will become apparent from the following description.

In one aspect, the present invention resides in a control system for a well-cleaning system of the type having a rotary spray device rotatably mounted on a support arm and connectable to a cleaning liquid supply by a selectively operable liquid control valve, the control system including:

a first waste liquid level sensor in the well detecting when waste liquid has been pumped from the well;

a control unit, operably connected to the cleaning liquid control valve; and a first timer and a second timer operably connected to the control unit;

so arranged that when the first waste liquid level sensor detects that waste liquid has been pumped from the well, the control unit operates the cleaning liquid control valve, to allow cleaning liquid to flow to the rotary spray device to clean the well, with a wash cycle having a duration determined by the second timer, the first timer preventing the control unit initiating a further wash cycle until the elapse of a preset period.

Preferably, the control unit is connected to a liquid waste pump in the well, and is connected to a second waste liquid level sensor in the well, spaced above a first waste liquid sensor, to operate the pump when the waste liquid is detected by the second waste liquid level sensor.

Preferably, the control unit shuts off the pump when the waste liquid level falls to the first liquid level sensor.

Alternatively, the control unit shuts off the pump after the wash cycle is completed.

Preferably, the control system further includes:

a well-condition sensor in the well, connected to the control unit, and operable to cause the control unit to open an additive injection valve to inject deodorant masks, chemicals and/or biological additives, from an additive supply source, into the cleaning liquid during the wash cycle.

Preferably, the control system further includes:

a hydrogen sulphide ($H_2S$) gas sensor in the well, connected to the control unit, and operable to cause the control unit to operate the well-cleaning system where $H_2S$ gas concentration in the well exceeds a preset limit.

Preferably, the control unit is connected to a remote control centre by radio- or microwave link or by a land line.

In a second aspect, the present invention resides in a well-cleaning system incorporating the control system as hereinbefore described.

In a third aspect, the present invention resides in a retrieval system for a well-cleaning system of the type having a rotary spray device rotatably mounted on a support arm and connectable to a cleaning liquid supply by a selectively operable liquid control valve, the retrieval system including:

a carriage at an end of the support arm spaced from the rotary spray device, slidably mounted on at least one pump guide rail in a well; and flexible retrieval means attached at one end to the support arm and extending from the well to enable the well-cleaning system to be raised or lowered in the well without man-entry to the well.

Preferably, the carriage is slidably mounted on a single pump guide rail or a pair of parallel spaced guide rails; and the flexible retrieval member is a chain, cable or rope.

In a fourth aspect, the present invention resides in a well-cleaning system incorporating the retrieval system as hereinbefore described.

In a fifth aspect, the present invention resides in a pressurised cleaning liquid supply system for a well-cleaning system of the type as hereinbefore described, the cleaning liquid supply system including:

a cleaning liquid supply line connected to a source of cleaning liquid and having a cleaning liquid flow valve;

a reservoir, spaced from an outlet of the supply line by an air gap; and a pressure pump in the reservoir operably connected to the rotary spray device;

so arranged that when the well-cleaning system is operating, the cleaning liquid flow valve allows flow of cleaning liquid to the reservoir to replenish the cleaning liquid pumped to the rotary spray device by the pressure pump.

In a sixth aspect, the present invention resides in a well-cleaning system incorporating the cleaning liquid supply system as hereinbefore described.

Other aspects of the present invention will become apparent from the following description.

BRIEF DESCRIPTION OF THE DRAWINGS

To enable the invention to be fully understood, preferred embodiments will now be described with reference to the accompanying drawings in which.

DETAILED DESCRIPTION OF THE PREFERRED EMBODIMENTS

Figure 1:
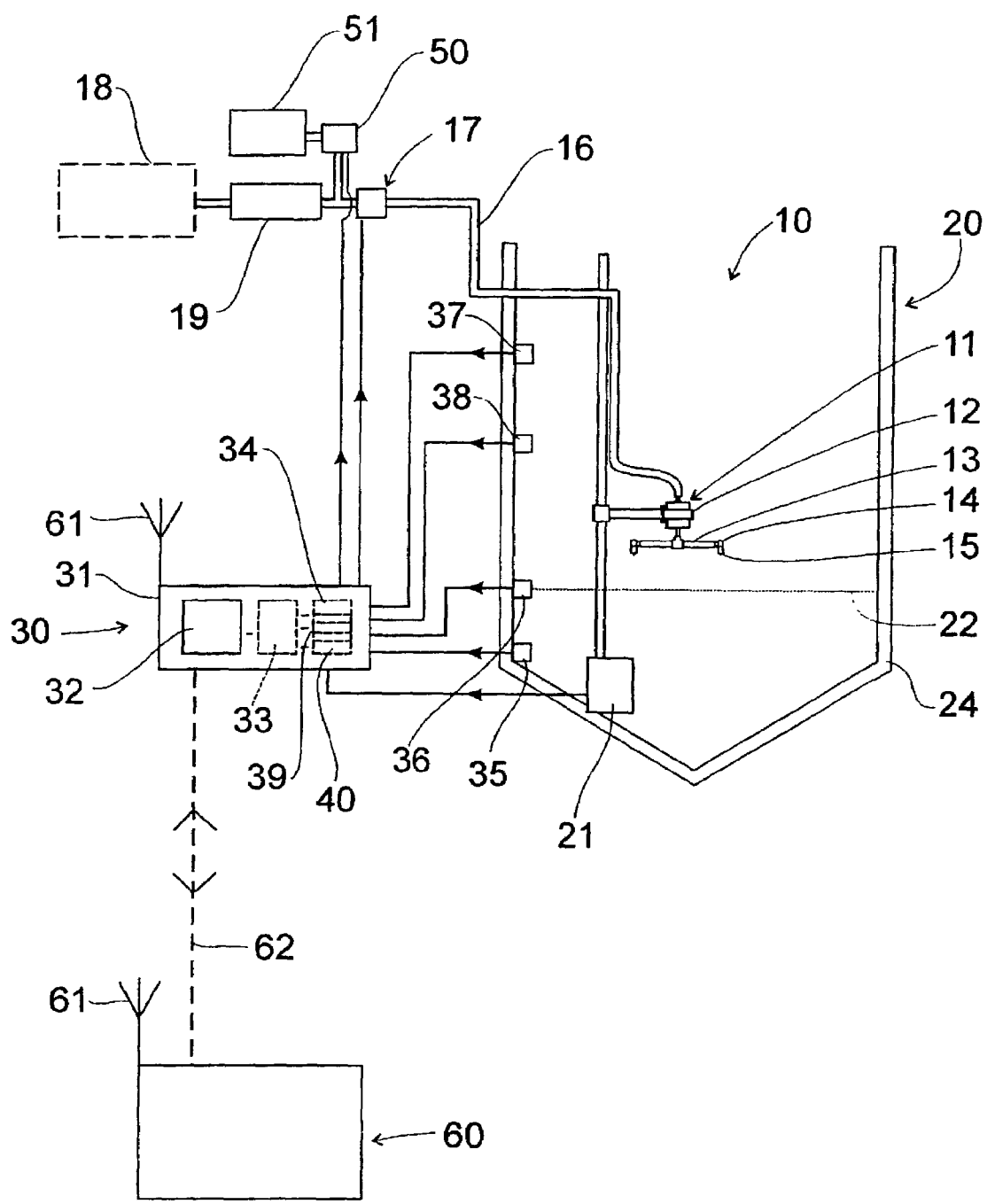
FIG. 1 is a schematic side view of the well-cleaning system provided with the control system.

Referring to FIG. 1, the well-cleaning system 10 is generally of the type disclosed in AU-B-39856193 (655111) (McCasker), where a rotary spraying device 11 is rotatably mounted on a mounting arm 12, and has a pair of radial spray arms 13. Each spray arm 13 has a spray head 14 with an adjustable spray nozzle 15. The well-cleaning system 10 is mounted in a sewage-holding well 20 above the sewage pump 21 (and above the highest level 22 of waste liquid in the well 20).

A cleaning water line 16 connects the rotary spray device 11 to a cleaning water control valve 17 (eg., a solenoid valve), which is connected to a reticulated mains water supply 18 via a reduced pressure zone (RPZ) valve 19, which prevents backflow of the water from the well-cleaning system 10 to the mains water supply 18 should the pressure in the latter fall.

The control system 30 has a housing 31 with a display/operation panel 32.

A computerised master control unit 33 in the housing 31 is connected to a cleaning valve control unit 34 which is operably connected to the cleaning water control valve 17.

First and second waste liquid sensors 35, 36 are provided in the well 20 at vertically-spaced locations to monitor when the waste liquid has been pumped out of the well 20 by the pump 21, and when the waste liquid has reached the highest permitted level 22, respectively.

A hydrogen sulphide ($H_2S$) gas sensor 37 and a well condition sensor 38 are also provided in the well 20 and are connected to the computerised control unit 33.

The computerised control unit 33 is also connected to the pump 21.

A washing frequency timer 39 and a washing duration timer 40 are connected to the computerised control unit 33.

When the second waste liquid sensor 36 detects that the waste liquid has reached the highest permitted level (22), the computerised control unit 33 switches on the pump 21 to pump out the waste liquid. When the waste liquid level falls to the first liquid level sensor 35, the computerised control unit switches off the pump 21. The control unit 33 operates the cleaning valve control unit 34 to cause the cleaning water control valve 17 to open to allow cleaning water from the mains supply 18 to flow to the well-cleaning system 10, where the nozzles 15 on the rotary spray device 11 spray the wall 24 of the well 20 to wash any residues from the wall 24. (The control unit 33 can be programmed to allow the pump 21 to also run while the washing is being effected.)

The duration timer 40 controls the period (eg., 3 minutes) during which the cleaning water is sprayed onto the wall 24 of the well 20.

When the cleaning has been completed, the frequency timer 39 determines the time delay (eg., 3 hours) before the cleaning step may be repeated, even if the pump 21 has been operated to pump out the well 20 a number of times in the intervening period.

Trials have shown that a program of 8 wash cycles in every 24 hours (ie., at 3-hourly intervals), with a cleaning duration time of 3 minutes each, will keep most wells 20 clean. This gives an aggregate of 24 minutes washing per day.

With the existing well-cleaning system of the prior art, where cleaning occurs whenever the pump is operating, there may be, eg., 200 minutes' wash time per day, where the pump does 40 starts per 24 hours with a pump-out time of 5 minutes per start.

By using the control system 30 of the present invention, the cleaning water saving is 88% in the above examples.

When the well-condition sensor 38 detects a build-up of odours and/or corrosive gases, the computerised control unit 33 opens an additive injection valve 50 which enables a deodorant "mask" and/or chemical and/or biological additives to be injected into the cleaning water line 16 from an additive supply tank 51.

When the $H_2S$ gas sensor 37 senses a build-up of $H_2S$ gas in the well 20, it causes the computerised control unit 33 to operate the well-cleaning system 10 so that the cleaning liquid sprayed in the well 20 will reduce the $H_2S$ gas concentration therein.

The control system 30 can send information regarding the conditions in the well 20 to a remote manned control centre 60 via a radio (or microwave) link 61 or via a landline 62. Alternatively, the manned control centre 60 can send instructions to the control system 30 for the operation of the well-cleaning system 10. For example, the manned control centre 60 could send instructions reprogramming the settings of the frequency timer 39 and/or duration timer 40.

Figure 2:
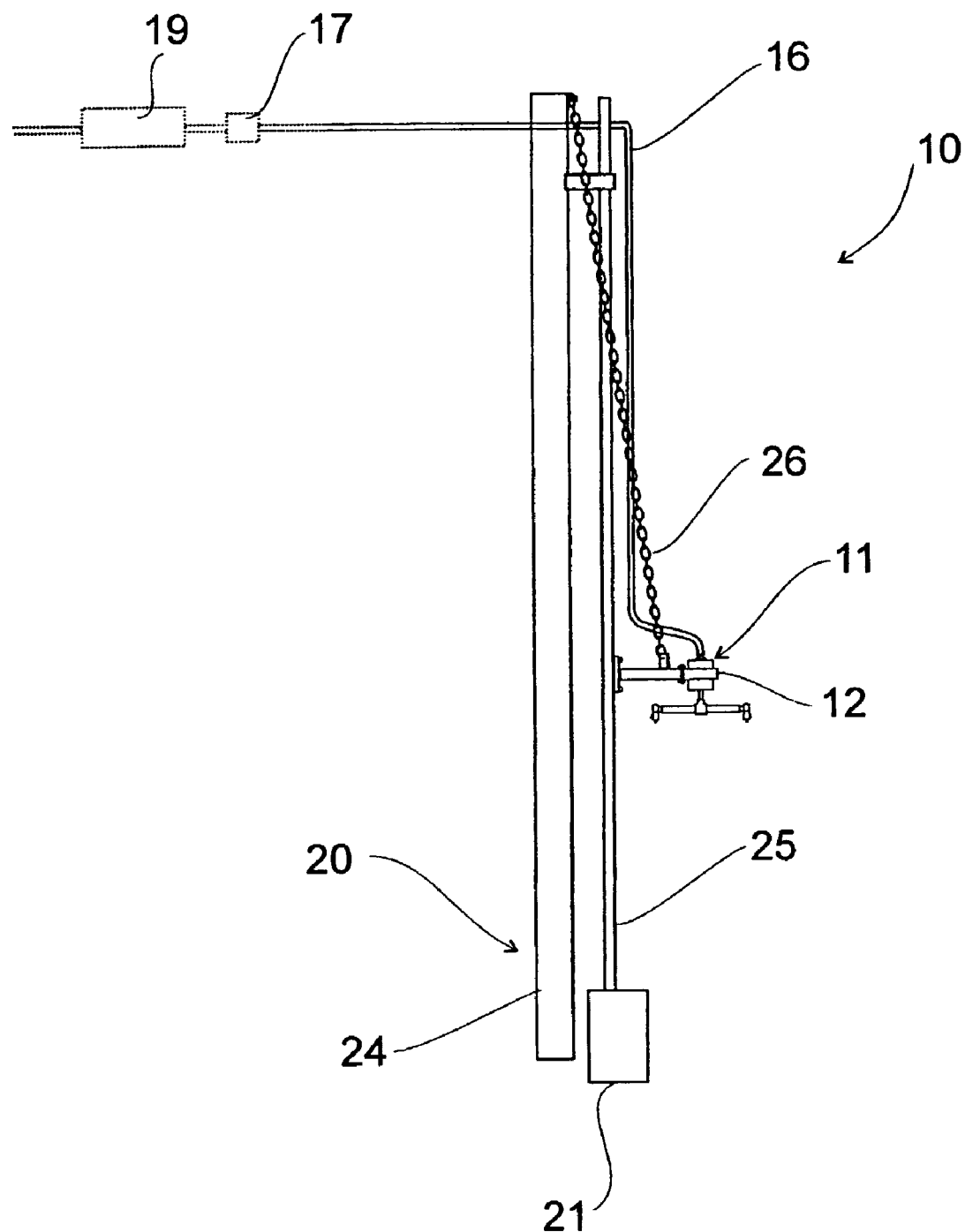
FIG. 2 is a schematic side view of the guide rail mounting system.

Referring to FIG. 2, the well-cleaning system 10 is designed for non-man-entry retrieval from the well 20, where the mounting arm 12 is mounted for movement along the pump guide rail(s) 25 fixed to the wall 24 of the well 20. A chain 26 enables the mounting arm 12 to be raised or lowered along the guide rails (25).

Figure 3:
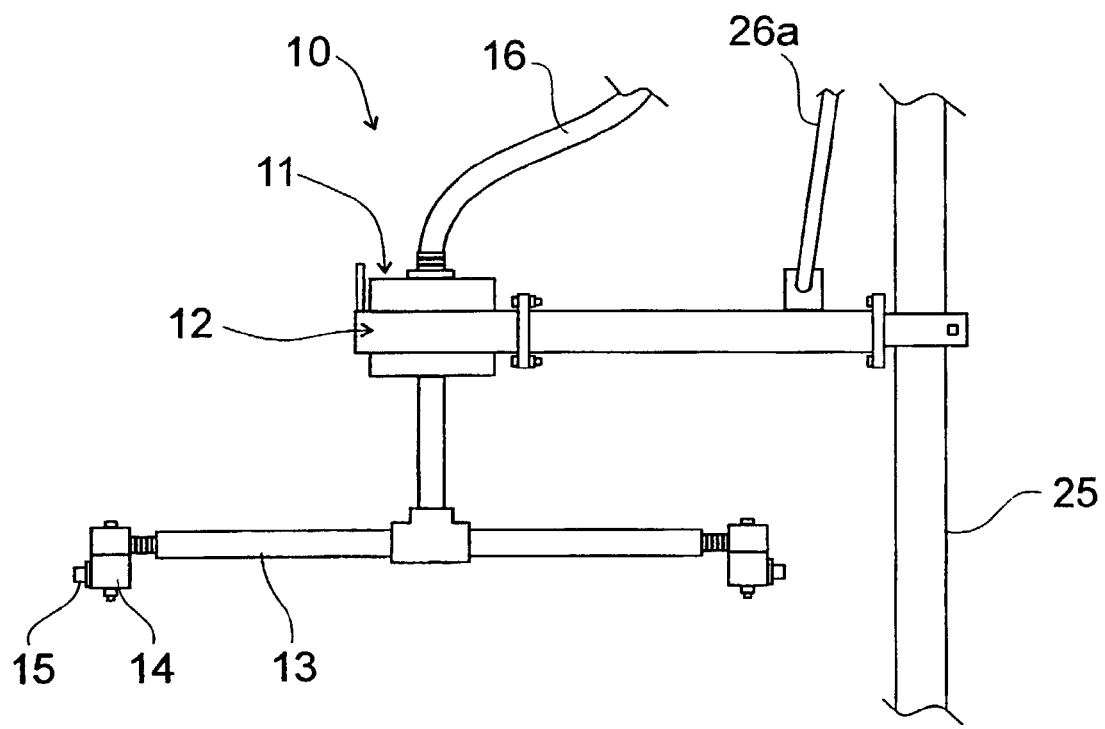
FIGS. 3 and 4 are respective side elevational and top plan views of one embodiment of the guide rail mounting system.
Figure 4:
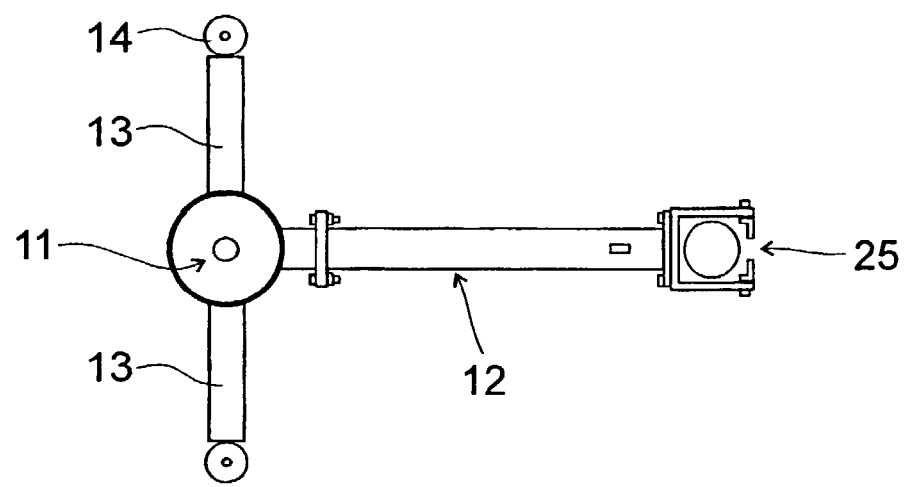
Figure 5:
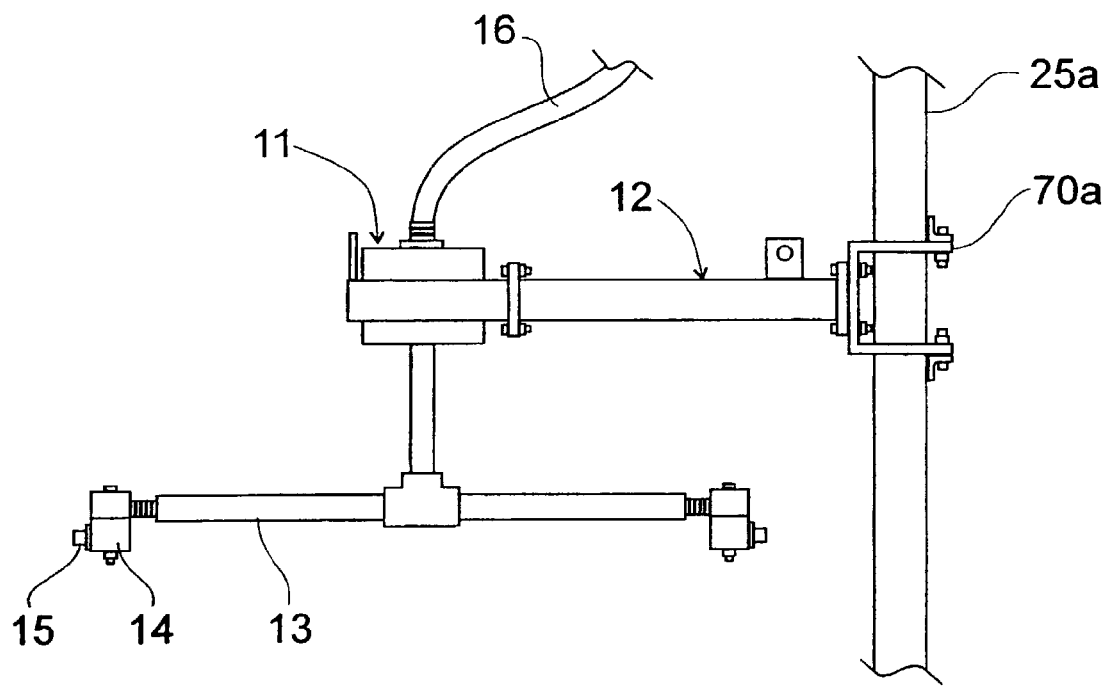
FIGS. 5 and 6 are respective side elevational and top plan views of a second embodiment of the guide rail mounting system.
Figure 6:
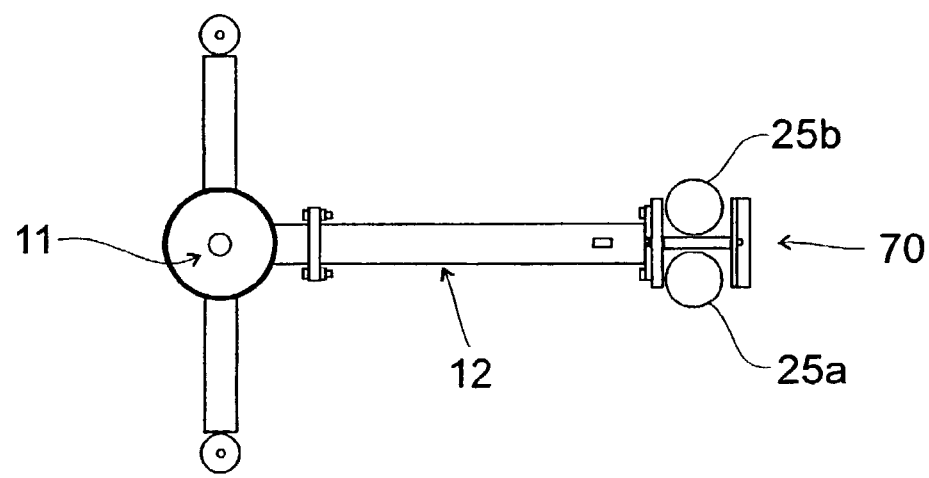

Referring to FIGS. 3 and 4, the mounting arm 12 has a carriage 70 (of substantially C-shape) slidably mounted on the single pump guide rail 25 and is raised or lowered by a cable or rope 26a (in substitution for the chain 26). In the alternative embodiment in FIGS. 5 and 6, the mounting arm 12 has a carriage 70a (of substantially I- or H-shape) slidably mounted on the parallel, spaced, pump guide rails 25a, 25b.

As the pump guide rails 25, 25a, 25b are standard installations in the wells 20 (to enable installation/removal of the pumps 21 without man-entry to the well 20), the well-cleaning system 10 can be installed without man-entry to the well 20.

Figure 7:
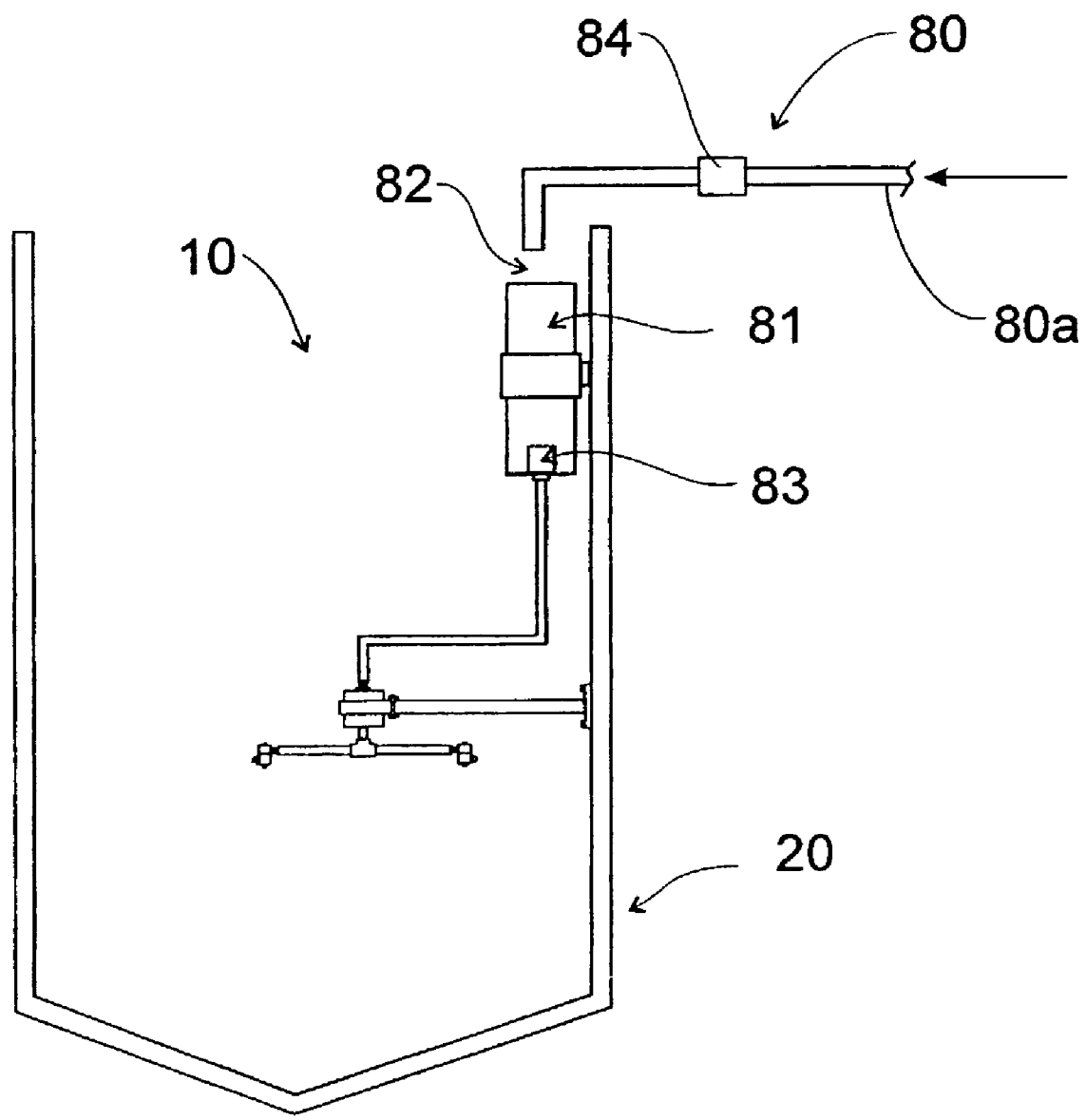
FIG. 7 is a schematic side elevational view of the well-cleaning system provided with the pressurised water supply system.

Referring now to FIG. 7, an alternative pressurised water supply system 80 for the well-cleaning system 10 has a cleaning liquid reservoir 81 separated from the end of a water supply line 80a by an air gap 82. A submersible pump 83 in the reservoir 81 supplies pressurised cleaning water to the well-cleaning system 10 on instructions from the computerised control unit 33 (eg., via the cleaning valve control unit 34). While the pump 83 is operating, a solenoid valve 84 in the water supply line 80a is opened to replenish the reservoir 81.

It will be readily apparent to the skilled addressee that the present invention can enhance the operation of the known well-cleaning system of AU-B-39856/93 in the following areas:

(a) reduced water consumption;
(b) effective control of odours, corrosive gas and/or $H_2S$ gas concentration; and
(c) installation, maintenance, repair and/or replacement of the well-cleaning system without man-entry to the well.

Various changes and modifications may be made to the embodiments described and illustrated without departing from the present invention.

The invention claimed is:

1. A sewage well-cleaning system comprising:
a rotary spray device rotatably mounted on a support arm in a sewage well and connectable to a cleaning liquid supply by a selectively operable liquid control valve; a liquid waste pump in the well; and control system including:
a first waste liquid level sensor in the well detecting when waste liquid has been pumped from the well by the liquid waste pump;
a control unit, operably connected to the cleaning liquid control valve; and
a first timer and a second timer operably connected to the control unit;
so arranged that when the first waste liquid level sensor detects that waste liquid has been pumped from the well by the pump, the control unit operates the cleaning liquid control valve, to allow cleaning liquid to flow to the rotary spray device to clean the well, with a wash cycle having a duration determined by the second timer, the first timer preventing the control unit from initiating a further wash cycle until the elapse of a preset period.

2. A system as claimed in claim 1, wherein the control unit is connected to the pump in the well, and is connected to a second waste liquid level sensor in the well, spaced above a first waste liquid sensor, to operate the pump when the waste liquid is detected by the second waste liquid level sensor.

3. A system as claimed in claim 1, wherein the control unit shuts off the pump when the waste liquid level falls to the first liquid level sensor.

4. A system as claimed in claim 1, wherein the control unit shuts off the pump after the wash cycle is completed.

5. A system as claimed in claim 1, and further including a well-condition sensor in the well, connected to the control unit, and operable to cause the control unit to open an additive injection valve to inject deodorant masks, chemicals and/or biological additives, from an additive supply source, into the cleaning liquid during the wash cycle.

6. A system as claimed in claim 1, further including a hydrogen sulfide ($H_2S$) gas sensor in the well, connected to the control unit, and operable to cause the control unit to operate the well-cleaning system when $H_2S$ gas concentration in the well exceeds a preset limit.

7. A system as claimed in claim 1, wherein the control unit is connected to a remote control center by radio- or microwave link or by a land line.

8. A sewage well-cleaning system as claimed in claim 1, and further incorporating a cleaning liquid supply system comprising:
a cleaning liquid supply line connected to a source of cleaning liquid and having a cleaning liquid flow valve;
a reservoir, spaced from an outlet of the supply line by an air gap; and
a pressure pump in the reservoir operably connected to the rotary spray device;
so arranged that when the well-cleaning system is operating, the cleaning liquid flow valve allows flow of cleaning liquid to the reservoir to replenish the cleaning liquid pumped to the rotary spray device by the pressure pump.

9. A system as claimed in claim 1; and further incorporating a retrieval system including
a carriage at an end of the support arm spaced from the rotary spray device, slidably mounted on at least one pump guide rail in a well; and
flexible retrieval member attached at one end to the support arm and extending from the well without man-entry to the well.

10. A system as claimed in claim 9, wherein the carriage is slidably mounted on a single pump guide rail or a pair of parallel spaced guide rails; and
the flexible retrieval member is a chain, cable or rope.

11. A system as claimed in claim 1, wherein the system further includes a retrieval system for the rotary spray device including a carriage at an end of the support arm spaced from the rotary spray device, slidably mounted on at least one pump guide rail in the well; and
flexible retrieval member attached at one end to the support arm and extending from the well to enable the well-cleaning system to be raised or lowered in the well without man-entry to the well.

12. A system as claimed in claim 11, wherein the carriage is slidably mounted on a single pump guide rail or pair of parallel spaced guide rails; and
the flexible retrieval member is a chain, cable or rope.

13. A system as claimed in claim 11, further incorporating a cleaning liquid supply system including
a cleaning liquid supply line connected to a source of cleaning liquid and having a cleaning liquid flow valve;
a reservoir, spaced from an outlet of the supply line by an air gap; and
a pressure pump in the reservoir operably connected to the rotary spray device;
so arranged that when the well-cleaning system is operating, the cleaning liquid flow valve allows flow of cleaning liquid to the reservoir to replenish the cleaning liquid pumped to the rotary spray device by the pressure pump.

14. A system as claimed in claim 2, wherein the control unit shuts off the pump when the waste liquid level falls to the first liquid level sensor.

15. A system as claimed in claim 14, wherein the control unit shuts off the pump after the wash cycle is completed.

16. A system as claimed in 15, further including a well-condition sensor in the well, connected to the control unit, and operable to cause the control unit to open an additive injection valve to inject deodorant masks, chemicals and/or biological additives, from an additive supply source, into the cleaning liquid during the wash cycle.

17. A system as claimed in 16, further including a hydrogen sulfide ($H_2S$) gas sensor in the well, connected to the control unit, and operable to cause the control unit to operate the well-cleaning system when $H_2S$ gas concentration in the well exceeds a preset limit, wherein the control unit is connected to a remote control center by radio- or microwave link or by a land line, and further incorporating a cleaning liquid supply system comprising:
a cleaning liquid supply line connected to a source of cleaning liquid and having a cleaning liquid flow valve;
a reservoir, spaced from an outlet of the supply line by an air gap; and
a pressure pump in the reservoir operably connected to the rotary spray device;
so arranged that when the well-cleaning system is operating, the cleaning liquid flow valve allows flow of cleaning liquid to the reservoir to replenish the cleaning liquid pumped to the rotary spray device by the pressure pump.

* * * * *